3,468,909
4-BENZOTHIENYL ETHYL 2,2-DICHLOROVINYL PHOSPHATE PESTICIDE
Stanley T. D. Gough, Raritan, N.J., assignor to Mobil Oil Corporation, a corporation of New York
No Drawing. Filed Dec. 23, 1966, Ser. No. 604,186
Int. Cl. C07f 9/08; C07d 63/18
U.S. Cl. 260—330.5   2 Claims

ABSTRACT OF THE DISCLOSURE

The compounds are of the class of 4-benzothienyl ethyl 2,2-dichlorovinyl phosphates and ring-substituted derivatives, useful as agronomical pesticides.

BACKGROUND OF THE INVENTION

This invention relates to organophosphorus compounds. It is more particularly concerned with a class of phosphate esters that is highly effective in the control of agronomical pests.

As is well known to those familiar with the art, various organophosphorus compounds have been proposed as pesticides. Such compounds, however, vary widely in effectiveness against various pests.

SUMMARY OF THE INVENTION

It is the discovery of this invention that a class of organophosphorus compounds containing a benzothienyl or substituted benzothienyl group, is highly effective in the control of agronomical pests, but ineffective against the house fly.

This invention provides a compound having the formula:

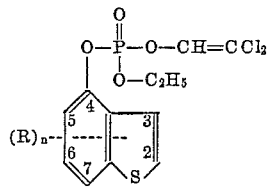

wherein

R is selected from the group consisting of nitro, methylmercapto, halogen, and alkyl ($C_1$–$C_4$); $n$ is 0 to 3; and R can be on any of the 2, 3, 5, 6, and 7 positions of the ring.

It also provides a method for combating agronomical pests that comprises contacting said pests with the aforedefined compound.

Description of Specific Embodiments

Non-limiting examples of the phosphates of this invention include:

4-benzothienyl ethyl 2,2-dichlorovinyl phosphate;
(4-benzothienyl-6-methyl) ethyl 2,2-dichlorovinyl phosphate;
(4-benzothienyl-7-nitro) ethyl 2,2-dichlorovinyl phosphate;
(4-benzothienyl-5,7-dinitro) ethyl 2,2-dichlorovinyl phosphate;
(4-benzothienyl-5,6,7-trimethyl) ethyl 2,2-dichlorovinyl phosphate;
(4-benzothienyl-2-ethyl) ethyl 2,2-dichlorovinyl phosphate;
(4-benzothienyl-3-butyl) ethyl 2,2-dichlorovinyl phosphate;
(4-benzothienyl-2,3-diisopropyl) ethyl 2,2-dichlorovinyl phosphate;
(4-benzothienyl-7-methylmercapto) ethyl 2,2-dichlorovinyl phosphate;
(4-benzothienyl-3-bromo) ethyl 2,2-dichlorovinyl phosphate;
(4-benzothienyl-2-chloro) ethyl 2,2-dichlorovinyl phosphate;
(4-benzothienyl-3-chloro) ethyl 2,2-dichlorovinyl phosphate;
(4-benzothienyl-5-chloro) ethyl 2,2-dichlorovinyl phosphate;
(4-benzothienyl-2,3-dichloro) ethyl 2,2-dichlorovinyl phosphate;
(4-benzothienyl-5,6,7-trichloro) ethyl 2,2-dichlorovinyl phosphate; and
(4-benzothienyl-2-iodo) ethyl 2,2-dichlorovinyl phosphate.

The compounds of this invention can be prepared in a two-step reaction. First, 4-hydroxybenzothiophene (or a substituted derivative) is reacted with diethyl chlorophosphite to produce 4-benzothienyl diethyl phosphite. As hydrogen chloride is evolved, an acid acceptor, such as trimethylamine or pyridine, is used. Secondly, the 4-benzothienyl diethyl phosphite is reacted with chloral to produce 4-benzothienyl ethyl 2,2-dichlorovinyl phosphate. This is demonstrated in the following examples.

EXAMPLE 1

Trimethylamine (32.4 g.) was added to a solution of 48.0 g. of 4-hydroxybenzothiophene in 500 ml. diethyl ether. The solution was stirred and cooled to 10° C. Then, 50.0 g. diethyl chloro phosphite was added dropwise over a period of one hour. A vigorous reaction occured, with separation of trimethylammonium chloride. The reaction mixture was allowed to stand overnight, then filtered, evaporated, and distilled. There was obtained 39.1 g. 4-benzothienyl diethyl phosphite boiling at 109° C. at 0.10 mm. mercury pressure. (S calc.: 11.85%; found: 12.75%.)

EXAMPLE 2

Chloral (4.92 g.) was added dropwise, with stirring, to 9.0 g. 4-benzothienyl diethyl phosphite at a rate such as to control the exothermic heat of reaction and to maintain the reaction at 62° C. The mixture was then stirred for two days and molecularly distilled at 0.3 mm. mercury pressure. 4-benzothienyl ethyl 2,2-dichlorovinyl phosphate came over at a pot temperature of 180° C. (C calc.: 40.79%; found: 38.84%, 40.19%. H calc.: 3.12%; found: 3.26%, 3.19%.) The product had $nd^{20}$ of 1.5703.

The following results are typical of the high biological activity of the compounds of this invention as used, for instance against the Mexican bean beetle (*Epilachna varivestis* Muls.) the two-spotted Spider Mite [Tutranychus Urticae (Koch)], and the Pea Aphid (Acyrthosithon Tisun); as measured by the percent mortality at a dosage concentration of 1000 p.p.m. and by the $LD_{50}$ value (p.p.m. concentration required to kill 50% of the test pests). In these tests the compounds are formulated as wettable powders and then diluted in water to the concentration of actual chemical indicated.

Mexican Bean Beetle

Cranberry bean plants are dipped in the appropriate concentrations of the respective formulations and then allowed to dry. Third instar larvae are then caged on the treated plants and maintained under greenhouse conditions for 48 hours, following which mortality counts are made. Three replicates are used for each level of application and then the $LD_{50}$ is calculated from the dosage mortality figures. The observed data for a compound of this invention, 4 - benzothienyl ethyl 2,2 - dichlorovinyl phosphate, are shown in the table.

Two-spotted Spider Mite and Pea Aphid

Candidate compound 4-benzothienyl ethyl 2,2-dichlorovinyl phosphate, formulated as wettable powder concentrate, is diluted in water to concentrations of actual chemical indicated.

Cranberry bean plants infested with various life stages of the two-spotted spider mite or the pea aphid are dipped in appropriate concentrations of the respective formulations and allowed to dry. Treated plants are maintained under greenhouse conditions for 72 hours and then observed for percentage mortality and plant injury. Three replicates are used for each level of application.

TABLE
[4-benzothienyl ethyl 2,2-dichlorovinyl phosphate]

| Pest | Percent Mortality at 1,000 p.p.m. | $LD_{50}$, p.p.m. |
|---|---|---|
| Mexican Bean Beetle | 100 | 30 |
| Pea Aphid | 67 | 430 |
| Two-spotted Spider Mite | 81 | 340 |

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

I claim:
1. A compound having the formula:

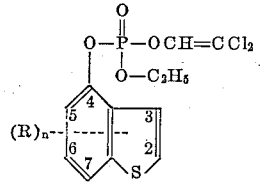

wherein R is selected from the group consisting of nitro, methylmercapto, halogen, and alkyl ($C_1$–$C_4$); $n$ is 0 to 3; and R can be on any of the 2, 3, 5, 6 and 7 positions of the ring.

2. 4-benzothienyl ethyl 2,2-dichlorovinyl phosphate.

References Cited

UNITED STATES PATENTS 2,956,073   10/1960   Whetstone et al. _____ 260—461

FOREIGN PATENTS 744,360   2/1960   Great Britain.

OTHER REFERENCES

Schulze, C. A.: 43:4417–8 (June 1949).

HENRY R. JILES, Primary Examiner

C. M. SHURKO, Assistant Examiner

U.S. Cl. X.R.

424—202